United States Patent
Kurihara

(10) Patent No.: US 8,267,460 B2
(45) Date of Patent: Sep. 18, 2012

(54) FRONT COVER FOR A VEHICLE

(75) Inventor: Kouji Kurihara, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 426 days.

(21) Appl. No.: 11/736,416

(22) Filed: Apr. 17, 2007

(65) Prior Publication Data

US 2007/0240924 A1 Oct. 18, 2007

(30) Foreign Application Priority Data

Apr. 18, 2006 (JP) ................. 2006-114237

(51) Int. Cl.
- *B62J 17/02* (2006.01)
- *B62K 11/14* (2006.01)
- *B62D 61/02* (2006.01)
- *B62D 39/00* (2006.01)

(52) U.S. Cl. ............... 296/78.1; 280/288.2; 180/219; 180/89.1

(58) Field of Classification Search ............ 362/475, 362/544, 476; 180/219, 89.1; 280/288.2, 280/288.4, 847, 850, 858, 154; 296/77.1, 296/78.1, 80, 81, 82, 83, 136.02, 153.5, 154, 296/181.2, 192, 198, 203.02, 848, 901.1
See application file for complete search history.

(56) References Cited

U.S. PATENT DOCUMENTS

| | | | |
|---|---|---|---|
| 6,203,093 B1 * | 3/2001 | Suzuki et al. | 296/78.1 |
| 6,249,744 B1 * | 6/2001 | Morita | 701/213 |
| 6,439,753 B1 * | 8/2002 | Sumada et al. | 362/475 |
| 7,374,007 B2 * | 5/2008 | Hasegawa et al. | 180/219 |
| 7,431,374 B2 * | 10/2008 | Konno et al. | 296/78.1 |
| 2001/0028176 A1 * | 10/2001 | Suzuki et al. | 296/70 |
| 2002/0189877 A1 * | 12/2002 | Yagisawa et al. | 180/219 |
| 2003/0062740 A1 * | 4/2003 | Takemura et al. | 296/78.1 |
| 2004/0145903 A1 * | 7/2004 | Arakawa | 362/494 |
| 2005/0279557 A1 * | 12/2005 | Konno et al. | 180/219 |
| 2006/0023462 A1 * | 2/2006 | Uemoto et al. | 362/475 |
| 2006/0056191 A1 * | 3/2006 | Uemura et al. | 362/473 |
| 2006/0192664 A1 * | 8/2006 | Kushida et al. | 340/463 |
| 2007/0002573 A1 * | 1/2007 | Aron | 362/473 |
| 2007/0222575 A1 * | 9/2007 | Kawashima | 340/476 |

FOREIGN PATENT DOCUMENTS

| | | | |
|---|---|---|---|
| JP | 01074187 | * | 3/1989 |
| JP | 10100968 A | * | 4/1998 |
| JP | A-1-115846 | | 4/1999 |
| JP | 2000118465 A | * | 4/2000 |
| JP | 2005119392 | * | 5/2005 |

* cited by examiner

*Primary Examiner* — Lesley D Morris
*Assistant Examiner* — Daniel Yeagley
(74) *Attorney, Agent, or Firm* — Keating & Bennett, LLP

(57) ABSTRACT

The front body cover includes a lens for a headlight device. A front portion or edge of the lens bulges forward of a straight line connecting the front edges of a handle cover with the front edges of a front fender. This arrangement reduces the wind resistance around the front of the motorcycle and improves aerodynamic performance.

20 Claims, 7 Drawing Sheets

FRONT COVER FOR A VEHICLE

RELATED APPLICATIONS

The present application is based on and claims priority under 35 U.S.C. §119(a)-(d) to Japanese Patent Application No. 2006-114237, filed on Apr. 18, 2006, the entire contents of which is hereby expressly incorporated by reference herein.

BACKGROUND OF THE INVENTION

1. Field of the Invention

The present invention relates to a front cover or fairing for a vehicle, such as a scooter-type motorcycle.

2. Description of the Related Art

Scooter-type motorcycles include a head pipe that runs between a front fender and a handle cover. The front fender may cover an upper portion of a front wheel while the handle cover may cover the periphery of a steering handle (see, for example, Japanese Patent Abstract JP-A-11-115846). A front body cover generally covers the head pipe. Since the front body cover is generally positioned rearward of the front fender and the handle cover, the front body cover may cause turbulence in the air flowing around the front body cover. This turbulence may cause a decrease in aerodynamic performance.

SUMMARY OF THE INVENTION

In view of the foregoing, a need exists for a motorcycle that has a front body cover that improves aerodynamic performance.

An aspect of the present invention involves a front body cover for a vehicle having a body. A front edge of the front body cover is disposed so as extend in front of a straight line connecting the front edges of the handle cover and the front fender. Further, the front surfaces of the front fender, the front body cover, and the handle cover are inclined in a rearward direction and form a generally straight line. Wind generally flows smoothly upward along the front fender, the front body cover, and the handle cover. This arrangement inhibits the wind flowing around the front of the motorcycle from becoming turbulent and improves the motorcycle's aerodynamic performance over a motorcycle having a conventional recessed front body cover.

An aspect of the present invention involves a motorcycle. The motorcycle has a front fender that covers an upper portion of a front wheel. The motorcycle further includes a handle cover. At least a portion of the handle cover is disposed rearward of and above the front fender so as to define a generally straight line. At least front portions of the handle cover and the front fender lie along the straight line when viewed from the side of the motorcycle. The motorcycle further includes a front body cover. The front body cover is disposed between the handle cover and the front fender. The front body cover covers at least a front portion of the motorcycle. At least a portion of the front body cover projects forward of the straight line.

Another aspect of the invention is directed to a motorcycle that has an array of front covers aligned so as to improve aerodynamic efficiency. The motorcycle includes a lower cover that has a forward-most portion. The motorcycle further includes an upper cover. At least a forward-most portion of the upper cover is disposed rearward of the forward-most portion of the lower cover so as to define a generally straight line along which the forward-most portions of the lower and upper covers lie when viewed from a side of the motorcycle. The motorcycle includes a middle cover that lies generally on the line; however, at least a portion of the middle cover projects forward of the generally straight line.

The present front cover described above have several features, no single one of which is solely responsible for the desirable attributes. Without limiting the scope of the invention as expressed by the claims, its more prominent features have been discussed briefly above. After considering this discussion, and particularly after reading the section entitled "Detailed Description of the Preferred Embodiments," one will understand how the features of the system and methods provide several advantages over conventional front covers.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The following are brief descriptions of the drawings.

DETAILED DESCRIPTION OF THE PREFERRED EMBODIMENTS

The following detailed description is now directed to certain specific embodiments of the invention. In this description, reference is made to the drawings wherein like parts are designated with like numerals throughout the description and the drawings.

An embodiment of a vehicle that has a front body cover according to the present invention will now be described. It should be understood that the disclosed embodiment is a preferred embodiment of the present invention and is not intended to limit the scope of the present invention.

FIGS. 1 through 7 illustrate a scooter-type motorcycle 1 equipped with a front body cover 23 according to a preferred embodiment of the present invention. The terms front, rear, left, and right are taken from the point of view of a rider sitting on the seat of the motorcycle 1. A longitudinal axis of the motorcycle is an axis that generally extends in the direction of travel for the motorcycle 1. Although illustrated in the context of a scooter-type motorcycle, the present body fairing arrangement can be used with other types of vehicles (e.g., street and off-road motorcycles), having front fairings that extend over one or more wheels and over an upper portion of the vehicle.

Figure 1:
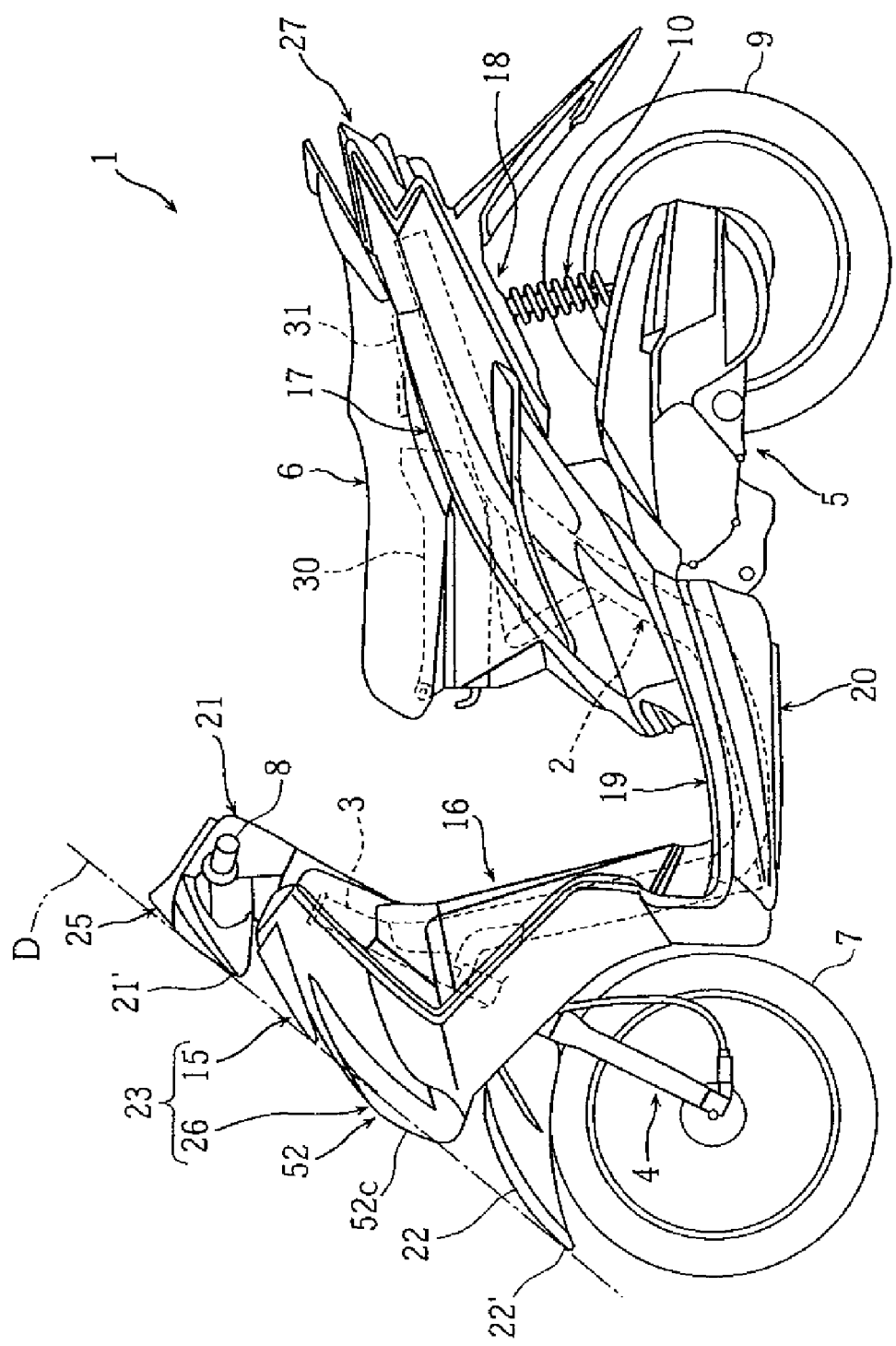
FIG. 1 is a side view of a motorcycle equipped with a front body cover configured in accordance with a preferred embodiment of the present invention.
Figure 2:
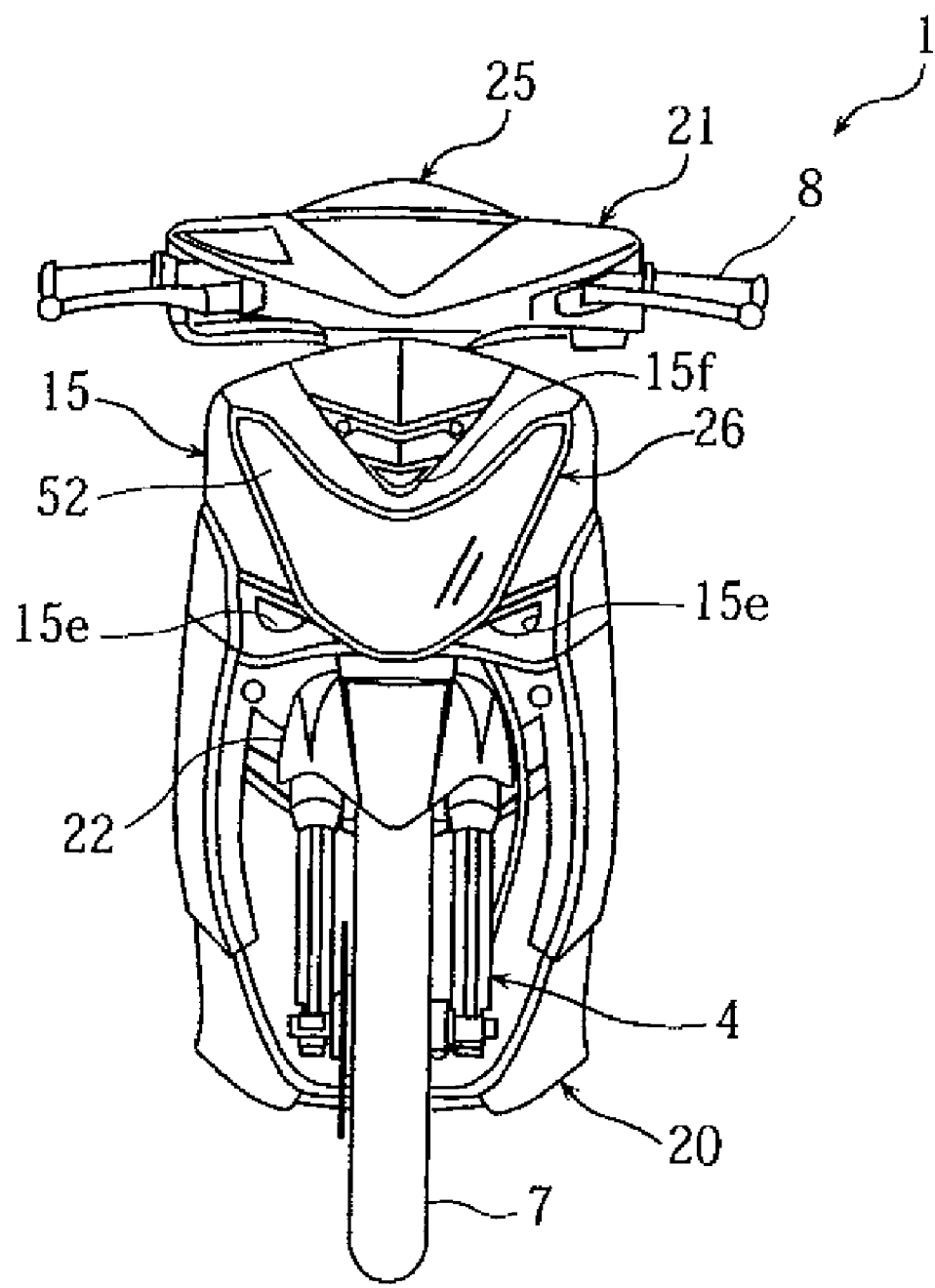
FIG. 2 is a front view of the motorcycle from FIG. 1 showing the front body cover.

FIG. 1 is a side view of a motorcycle 1 equipped with the front body cover 23. FIG. 2 is a front view of the motorcycle 1 from FIG. 1. The motorcycle 1 includes a skeleton-type body frame 2 and a head pipe 3 positioned at the front end of the body frame 2. The motorcycle 1 further includes a front fork 4 and a swing-type engine unit 5. The front fork 4 is pivotably supported by the head pipe 3 and is capable of being steered left and right. The engine unit 5 is pivotably supported by the body frame 2 and can swing up and down. Mounted above the engine unit 5 on the body frame 2 is a straddle-type seat 6. The seat 6 may accommodate up to two riders.

The front lower end of the front fork 4 supports a front wheel 7. A steering handle 8 is fixed to an upper rear end of the front fork 4. A front fender 22 covers the upper side of the front wheel 7. A rear wheel 9 is rotatably supported by a rear end section of the engine unit 5. A shock absorber 10 is disposed between the engine unit 5 and the body frame 2.

A storage box 30 and a fuel tank 31 are respectively positioned beneath the seat 6. The storage box 30 may be positioned in front of the fuel tank 31. The storage box 30 may support the front end of the seat 6 so as to allow the seat 6 to rotate in an upward direction to access the storage box 30.

A handle cover 21 covers the periphery of the steering handle 8. The handle cover 21 may include a meter unit 25. The meter unit 25 may include a speedometer, a fuel level meter, etc. The front side of the head pipe 3 is covered by the front body cover 23. A rear side of the head pipe 3 is covered by a leg shield 16. The rider's feat may rest on a footboard 19 between the leg shield 16 and left and right side covers 17, 17. An under cover 20 may cover the lower side of the footboard 19.

The lower side periphery of the seat 6 is covered by the left and right side covers 17, 17. A rear fender 18 is arranged on undersides of the left and right side covers 17, 17 and covers an upper portion of the rear wheel 9.

The motorcycle 1 further includes a tail lamp unit or light unit 27. In the illustrated embodiment, the light unit 27 is located near the rear end section of the left and the right side covers 17, 17. The light unit 27 preferably attaches to a rear end section of the body frame 2.

The front body cover 23 may include a headlight device 26 and a front cover 15. The front cover 15 may surround a periphery of the headlight device 26 and be positioned between the front fender 22 and the handle cover 21. The handle cover 21 is positioned rearward of and above the front fender 22.

Figure 3:
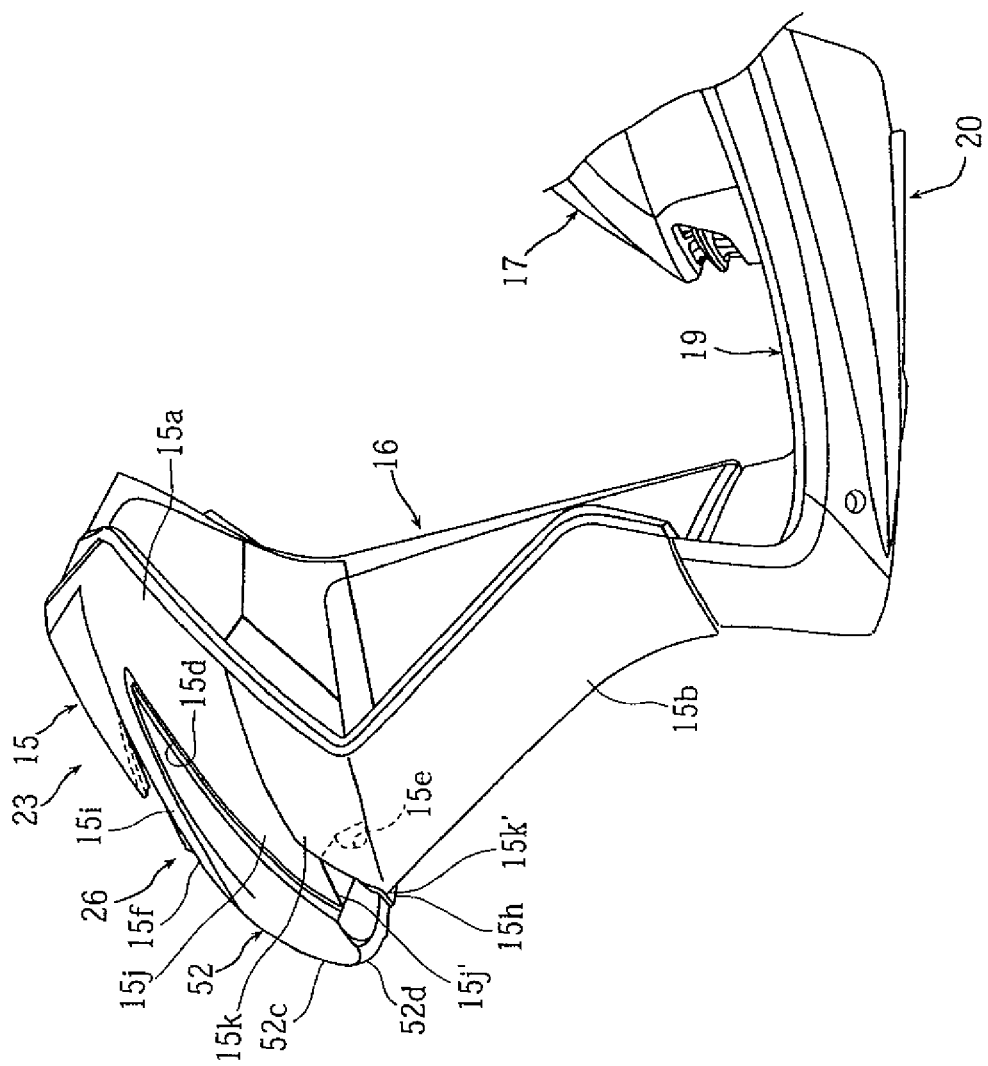
FIG. 3 is an enlarged partial side view of a front portion of the motorcycle from FIG. 1 showing the front body cover.

FIG. 3 is an enlarged partial side view of a front portion of the motorcycle 1 from FIG. 1 showing the front body cover 23. The front cover 15 comprises upper cover portions 15a. The portion 15a preferably extends in a forward and obliquely downward direction. The front cover 15 further comprises lower cover portions 15b. The lower cover portions 15b preferably extend in a rearward and obliquely downward direction so as to cover a rear portion of the front fender 22. The lower cover portions 15b may have a dog-legged shape as viewed from a side of the motorcycle 1.

Figure 4:
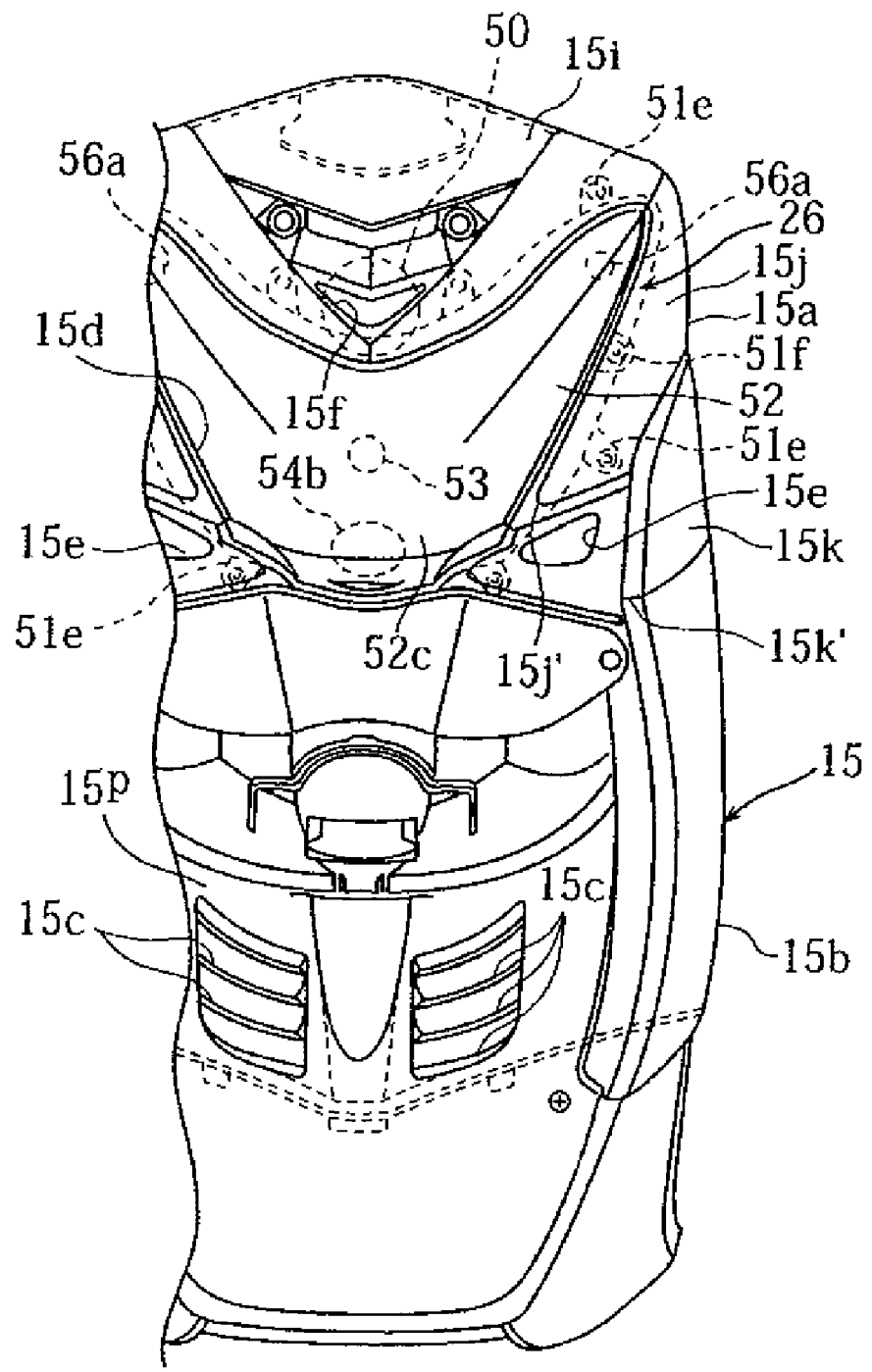
FIG. 4 is a partial front view of the front portion of the motorcycle from FIG. 3 showing the front body cover.
Figure 5:
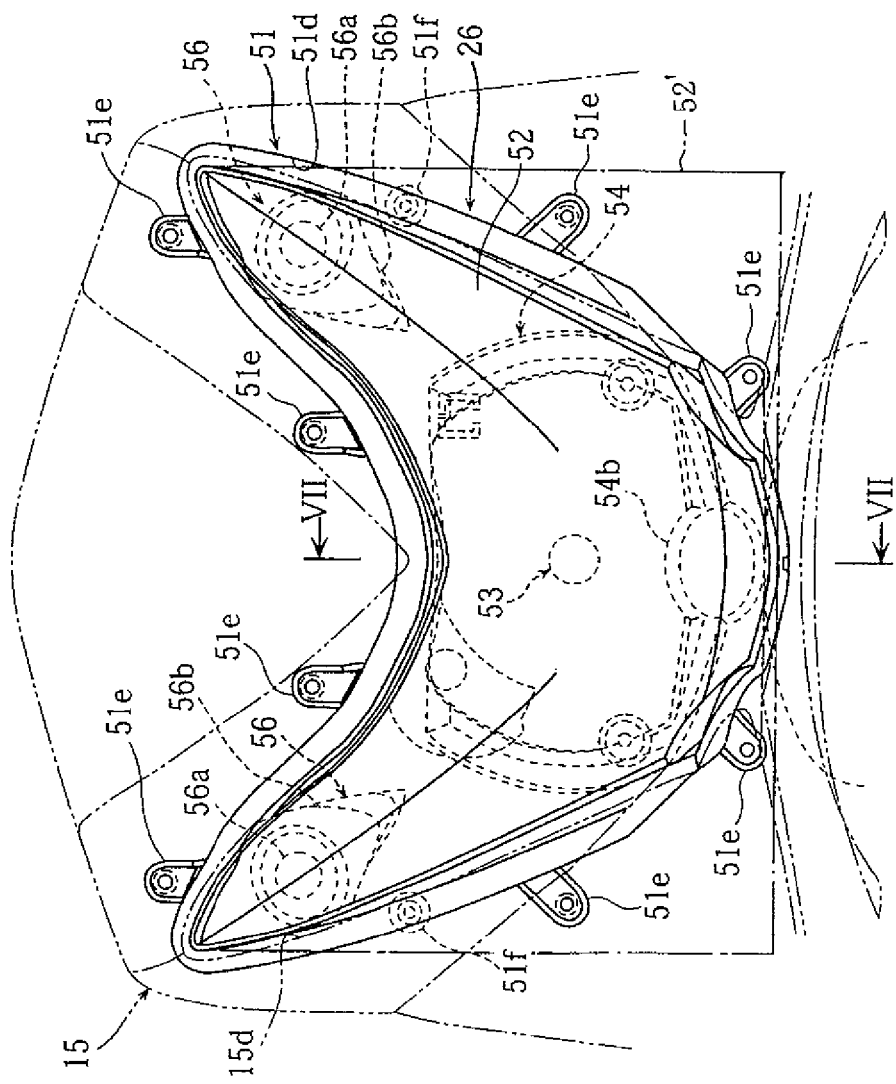
FIG. 5 is an enlarged view of a headlight device from FIG. 4.

FIG. 4 is a partial front view of the front portion of the motorcycle 1 from FIG. 3. FIG. 5 is an enlarged view of a headlight device 26 from FIG. 4. As most clearly shown in FIG. 4, the front cover 15 includes a plurality of travel wind inlets 15c. The inlets 15c are centrally formed in an inner panel 15p and preferably extend in a lateral direction across the front of the motorcycle 1. The inner panel 15p connects the left and right lower cover portions 15b, 15b and is preferably a subcomponent of the front cover 15. As most clearly shown in FIG. 2, the front fork 4 and the front wheel 7 substantially cover the inlets 15c. Air flowing to the engine unit 5 passes through the inlets 15c and then through a tunnel-shaped passage formed by the foot board 19 and the undercover 20.

As most clearly shown in FIGS. 3 and 4, the upper cover portion 15a of the front cover 15 includes a light opening 15d. The light opening 15d preferably has a width that substantially matches the width of the upper cover portion 15a. The headlight device 26 is mounted in the light opening 15d.

The light openings 15d may have a V-shape as viewed from the front of the motorcycle 1. A lower edge of the light opening 15d is positioned at a lower end of the upper cover portion 15a. The left and right upper edges of the light opening 15d are positioned in the vicinity of the left and right upper edges of the upper cover portion 15a.

The upper cover portion 15a comprises a V-shaped cover portion 15i positioned in a central and upper region of the front of the motorcycle 1. The middle of the cover portion 15i extends in a forward and downward direction toward the light openings 15d. The left and right upper edges 15j, 15j are positioned on the left and right sides of the V-shaped cover portion 15i. The left and right upper edges 15j, 15j extend in a forward and downward direction and form the left and right edges of the light openings 15d. The left and right lower edges 15k, 15k are positioned below the left and right upper edges 15j, respectively, and extend outside the width of the upper edges 15j.

Pointed portions 15j' are formed at the ends of the left and right upper edges 15j, 15j. Pointed portions 15k' are formed at the ends of the left and right lower edges 15k, 15k. The pointed portions 15k' are preferably positioned below the pointed portions 15j' and have substantially the same longitudinal position as the pointed portions 15j'.

As shown most clearly in FIGS. 2 and 3, the front cover 15 includes air duct portions 15e, 15e. The air duct portions 15e, 15e are formed at left and right, lower ends of the upper cover portion 15a and on either side of the light opening 15d. The inner peripheral edges of the left and right air duct portions 15e define rearward extending cylinders.

As shown most clearly in FIG. 4, the left and right air duct portions 15e, 15e are disposed below the pointed portions 15j' and above the pointed portions 15k'. As shown most clearly in FIG. 3, the left and right air duct portions 15e, 15e are hidden by the pointed portions 15k' when viewed from the side of the motorcycle 1.

As shown most clearly in FIG. 4, the front cover 15 further includes a V-shaped horn opening 15f. A horn 50 is disposed behind the upper cover portion 15a and aligned with the horn opening 15f.

Figure 6:
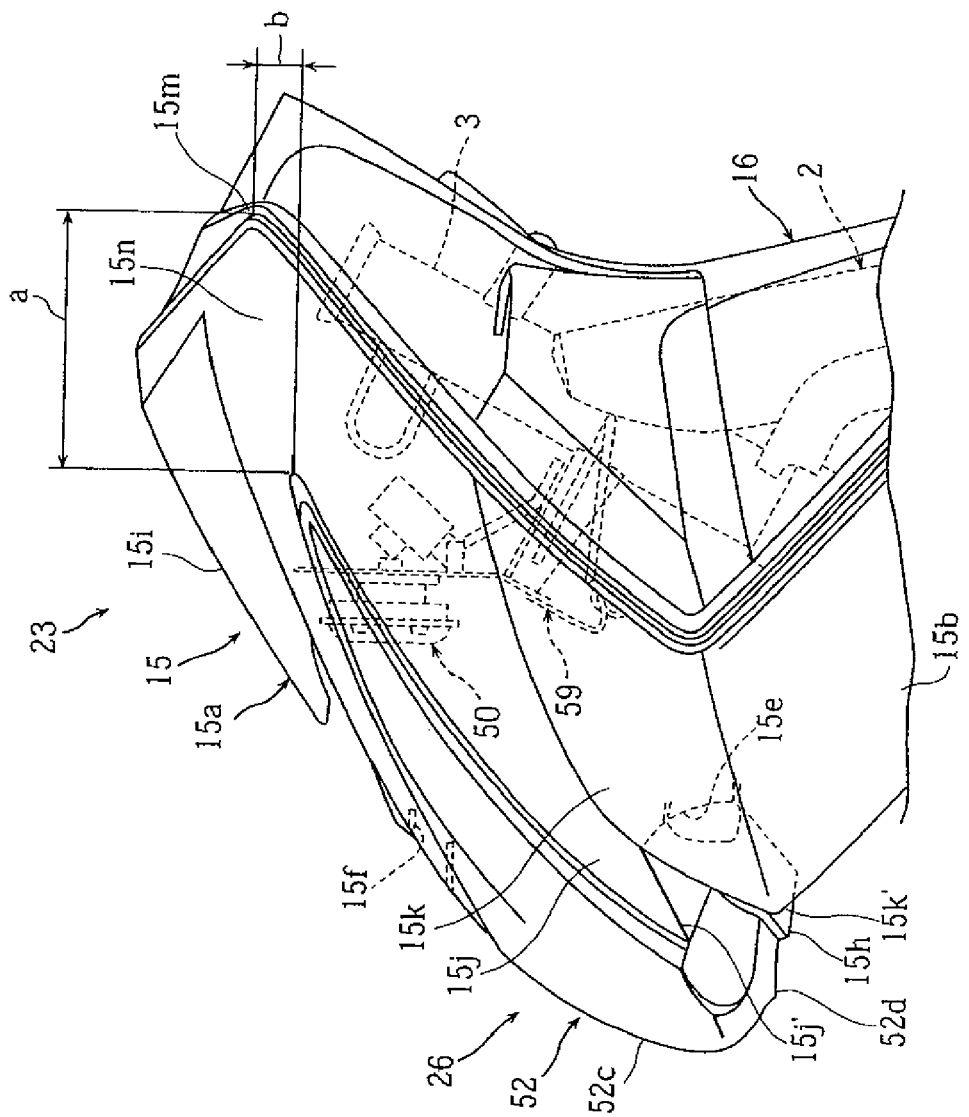
FIG. 6 is an enlarged partial side view of an upper portion of the front body cover from FIG. 3.

FIG. 6 is an enlarged partial side view of an upper portion of the front body cover 23 from FIG. 3. The horn 50 may be fixed to the head pipe 3 via a forwardly projecting head bracket 59. Sound from the horn 50 passes through the horn opening 15f and in front of the motorcycle 1. The horn opening 15f is disposed on the V-shaped cover portion 15i of the upper cover portion 15a. An inner peripheral edge of the horn opening 15f defines a rearward extending cylinder.

The width of the front body cover 23 may be reduced to improve aerodynamic performance by incorporating the horn opening 15f into the cover portion 15i of the front cover 15 rather than being separate from the front cover 15. The sound of the horn 50 may be improved with the V-shaped horn opening 15f. The horn opening 15f and the left and right air duct portions 15e provide flow passages for air to flow around the headlight device 26 and cool the headlight device 26. The openings 15f, 15e further increase the stiffness of the front cover 15 that surrounds the light openings 15d.

Figure 7:
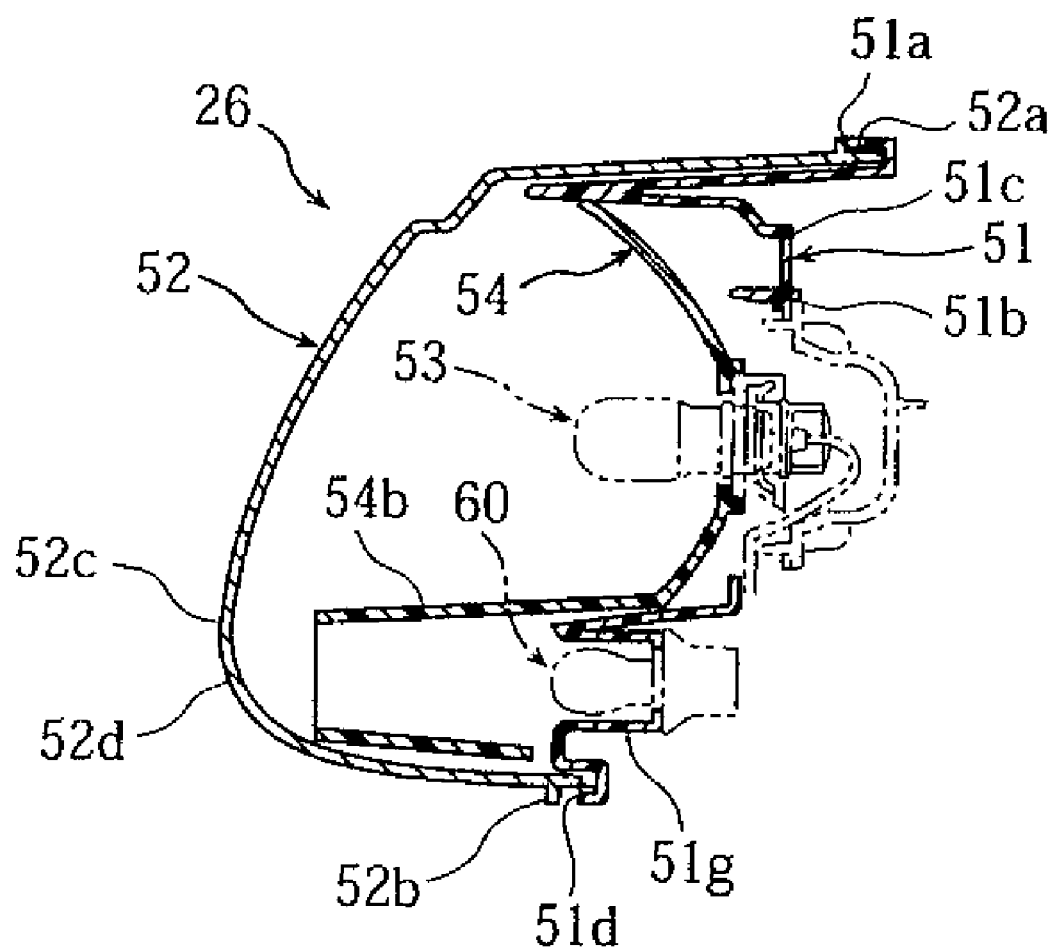
FIG. 7 is a cross sectional side view taken along line VII-VII in FIG. 5.

As most clearly shown in FIGS. 5 and 7, the headlight device 26 comprises a light body 51 having a lens opening 51a facing the front of the motorcycle 1, a lens 52 arranged on the light body 51 to cover the lens opening 51a, a bulb 53 mounted detachably to the light body 51, and a reflector 54. The light body 51 and reflector 54 may be made of a resin or other like material. The lens 52 may be colorless and transparent. The bulb 53 may be positioned centrally in the vehicle width direction. The reflector 54 preferably reflects light from the bulb 53 toward the lens 52.

The headlight device 26 further comprises flashers 56, 56 arranged on either side of the bulb 53 and preferably in the light body 51. Each flasher 56 comprises a flasher bulb 56a and a flasher reflector 56b. The flasher bulbs 56a may be detachably mounted to the light body 51. The flasher reflectors 56b, 56b reflect light from the flasher bulbs 56a toward the lens 52. The lens 52 can be the same lens described above with respect to the bulb 53. Alternatively, the lens associated with the flasher bulbs may be a separate lens from the lens 52.

FIG. 7 is a cross sectional side view taken along line VII-VII in FIG. 5. As shown most clearly in FIG. 7, the reflector 54 is preferably cup-shaped with the bulb 53 mounted near the back of the reflector 54.

The reflector 54 and a position guide 54b may have a unitary structure. As shown most clearly in FIGS. 5 and 7, the position guide 54b may have the shape of a wide, elliptical cylinder that extends in a longitudinal direction. A bulb 60 is disposed in the position guide 54b. Light from the bulb 60 increases the visibility of the motorcycle 1 when operating the motorcycle 1 during the daytime. Light emitted by the position guide 54b and the reflector 54 passes through the lens 52 to be visible from outside the motorcycle 1.

As most clearly shown in FIG. 7, an inner peripheral surface of the head reflector 54 may be coated with a reflective material by, for example, vapor deposition of an aluminum material or the like.

The light body 51 preferably comprises a body 51c having a bulb mount hole 51b. The light body 51 further includes a groove 51d formed at a peripheral edge of the lens opening 51a of the body 51c, a plurality of mount pieces 51e, and cylindrical-shaped mount bosses 51f. The plurality of mount pieces 51e may be contiguous with the edge of the lens opening 51a. The bosses 51f may be formed on left and right, outer edges of the body 51c and project rearward.

An outer peripheral edge 52a of the lens 52 is preferably sealed in the groove 51d by an adhesive. A positioning projection 52b formed on the outer peripheral edge 52a of the lens 52 abuts against the edge of the lens opening 51a.

The light body 51 is mounted in the light openings 15d from the rear of the motorcycle 1. The light body 51 is preferably fixed to the front cover 15 by screwing the mount pieces 51e to bosses of the front cover 15. The left and right mount bosses 51f, 51f are screwed to mount seats on the leg shield 16.

The lens 52 may be substantially V-shaped as viewed from the front of the motorcycle 1 and integrally cover the left and right flashers 56, 56. The lens 52 need not be entirely V-shaped and instead may have only a V-shaped upper edge as is illustrated in alternate lens 52' in dashed lines of FIG. 5. The lens 52 is preferably formed so that the left and right, upper ends of the V-shape are substantially flush with the front cover 15 as viewed from the side of the motorcycle 1. A lower portion of the lens 52 bulges in a forward and obliquely downward direction to form a generally spherical-shaped front cover 15. As shown most clearly in FIG. 6, a lower surface of the bulge portion 52c may be covered by the lower edges 15h of the light opening 15d. Further, the lower edges 15h may be positioned rearward of a lower edge 52d of the lens 52.

The bulb 53 is disposed near the center of the lens 52. The flasher bulbs 56a, 56a are arranged at left and right, upper ends of the V-shaped lens 52. The V-shape of the lens 52 with the flasher bulbs 56a, 56a arranged at the left and right, upper ends of the lens 52 improves aerodynamic performance.

The front cover 15 further includes a flasher rear cover portion 15n. As shown most clearly in FIGS. 5 and 6, the flasher rear cover portion 15n may extend between the rear edges of the left and right flasher bulbs 56a, 56a of the front cover 15 and a rear edge 15m of the front cover 15. Preferably, a horizontal distance "a" measured in a horizontal direction is longer than a vertical distance "b" measured in a vertical direction. With the horizontal dimension a longer than the vertical dimension b, the front cover 15 is inclined rearward without being upright. This arrangement decreases wind resistance of air flowing around the front cover 15.

There is no need for an additional cover member since the left and right flasher bulbs 56a, 56a are arranged in the light body 51 of the headlight device 26 and the respective flasher bulbs 56a and the bulb 53 are covered by the common lens 52. An additional cover member may block light between the bulb 53 and the left and right flasher bulbs 56a, 56a and add additional wind resistance.

As shown most clearly in FIG. 1, the bulge portion 52c of the lens 52 preferably projects forward of the motorcycle 1 and in front of the straight line D. Line D is defined by a front edge 21' of the handle cover 21 and a front edge 22' of the front fender 22. As viewed from the side of the motorcycle 1, the front edge 21' of the handle cover 21 extends along the straight line D.

The respective front edges of the front fender 22, the front cover 15, and the handle cover 21 lie on line D and angle in a rearward direction along line D so as to not create large steps which may increase air resistance. Air flowing towards the front of the motorcycle 1 travels in an upward direction along the front fender 22, the front cover 15, and the handle cover 21 and eventually flows over an operator's head. Such an arrangement may reduce wind resistance and improve aerodynamic performance.

Aerodynamic performance may be improved by having a portion of the front body cover 23 project forward of the straight line D. Furthermore, since the front fender 22 is supported by the vehicle body to turn left and right with the front wheel 7, the front fender 22 and the front body cover 23 maintain a consistent, relative, vertically position irrespective of whether the front wheel 7 is in forward or backward positions.

As most clearly shown in FIG. 6, the lower edges 15h of the front cover 15 cover a lower surface of the lens 52. The lower edges 15h are positioned rearwardly of the lower edge 52d of the lens 52. A step is formed between the lower surface of the lens 52 and the lower edges 15h of the front cover 15. Consequently, the wind resistance below the lower surface of the lens 52 is decreased which reduces the steps negative impact on aerodynamic performance. Locating the step closer to the front end degrades aerodynamic performance.

In addition to the illustrated embodiment which has a portion of the lens 52 projecting forward of the straight line D, alternatively, the front edge of the front cover 15 projects forward of the straight line D. Substantially the same aerodynamic benefit is achieved with either the lens 52 or a portion of the front body cover 23 projecting forward of line D. In the later embodiment, the headlight device 26 need not be located in the front body cover 23.

The front body cover 23 described above may be used with a motorcycle, scooter, bicycle, automobile, or other vehicle on land, water, or in the air.

In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A motorcycle including an array of front covers aligned so as to improve aerodynamic efficiency, the motorcycle comprising:
    a lower cover having a front-most edge;
    an upper cover arranged to cover and rotate with a steering handle, at least a front-most edge of the upper cover being disposed rearward of the front-most edge of the lower cover so as to define a straight line along which the front-most edges of the lower and upper covers lie when viewed from a side of the motorcycle; and
    a middle cover lying on the straight line and comprising a lens arranged to extend across a longitudinal center of the motorcycle in a vehicle width direction, the lens extending rearward across the straight line with at least a portion of the lens projecting forward of the straight line; wherein
    the middle cover at least partially surrounds a periphery of the lens, the middle cover including a V-shaped cover portion, left and right upper edges, left and right lower edges, and a lower edge of a light opening;
    a lower surface of the lens extends forwardly from the lower edge of the light opening of the middle cover;
    the lower surface of the lens is curved when viewed from the side of the motorcycle; and
    forward-most portions of the left and right lower edges are disposed rearward of forward-most portions of the left and right upper edges and rearward of a forward-most portion of the V-shaped cover portion.

2. The motorcycle according to claim 1, wherein the motorcycle is a scooter.

3. A motorcycle comprising:
    a front fender covering an upper portion of a front wheel;
    a handle cover arranged to cover and rotate with a steering handle, at least a portion of the handle cover being disposed rearward of and above the front fender so as to define a straight line along which front-most edges of the handle cover and the front fender lie when viewed from a side of the motorcycle; and
    a front body cover disposed between the handle cover and the front fender and comprising a lens arranged to extend across a longitudinal center of the motorcycle in a vehicle width direction, the front body cover covering at least a front portion of the motorcycle, the lens extending rearward across the straight line with at least a portion of the lens projecting forward of the straight line; wherein
    the front body cover includes a front cover at least partially surrounding a periphery of the lens, the front cover including a V-shaped cover portion, left and right upper edges, left and right lower edges, and a lower edge of a light opening;
    a lower surface of the lens extends forwardly from the lower edge of the light opening of the front cover;
    the lower surface of the lens is curved when viewed from the side of the motorcycle; and
    forward-most portions of the left and right lower edges are disposed rearward of forward-most portions of the left and right upper edges and rearward of a forward-most portion of the V-shaped cover portion.

4. The motorcycle according to claim 1, further comprising a vehicle body, the front wheel being suspended from the vehicle body so as to turn left and right in unison with the front fender.

5. The motorcycle according to claim 1, wherein at least a substantial portion of a front edge of the handle cover lies along the straight line.

6. The motorcycle according to claim 1, wherein at least a portion of a surface of the lens projects forward of the straight line.

7. The motorcycle according to claim 1, wherein at least a portion of a front edge of the lens projects forward of the straight line.

8. The motorcycle according to claim 1, further comprising a headlight covered by the lens.

9. The motorcycle according to claim 8, wherein a portion of an underside of the lens is covered by the lower edge of the light opening of the front cover.

10. The motorcycle according to claim 9, wherein a forward-most portion of the lower edge of the light opening of the front cover is disposed rearward of a forward-most portion of the lens.

11. The motorcycle according to claim 8, wherein the headlight comprises left and right flashers.

12. The motorcycle according to claim 11, wherein the lens covers the headlight and the left and right flashers.

13. The motorcycle according to claim 11, wherein an upper edge of the lens has a generally V-shape as viewed from a front of the motorcycle, and wherein the left and right flashers are disposed at the upper ends of the V-shape.

14. The motorcycle according to claim 13, wherein the front cover includes a rear cover portion, the rear cover portion extending between rear most edges of the left and right flashers and a rear most edge of the front cover.

15. The motorcycle according to claim 14, wherein a horizontal distance between the rear most edges of the left and right flashers and the rear most edge of the front cover is greater than a vertical distance between the rear most edges of the left and right flashers and the rear most edge of the front cover.

16. The motorcycle according to claim 14, wherein the V-shaped cover portion covers an upper portion of the headlight.

17. The motorcycle according to claim 16, wherein the V-shaped cover portion is disposed above the upper edge of the lens.

18. The motorcycle according to claim 16, further comprising a horn, the horn being disposed rearward of the V-shaped cover portion.

19. The motorcycle according to claim 18, wherein the V-shaped cover portion of the front cover has a V-shaped horn opening.

20. The motorcycle according to claim 1, further comprising a headlight bulb and a flasher bulb positioned so that when viewed from a front location of the motorcycle the headlight bulb is disposed behind the portion of the lens that projects forward of the straight line and the flasher bulb is disposed behind a portion of the lens that extends rearward across the straight line.

* * * * *